Jan. 5, 1971          C. K. STEDMAN          3,553,625
SIDE SENSITIVE MINIATURIZED PRESSURE TRANSDUCER
Filed Dec. 29, 1967
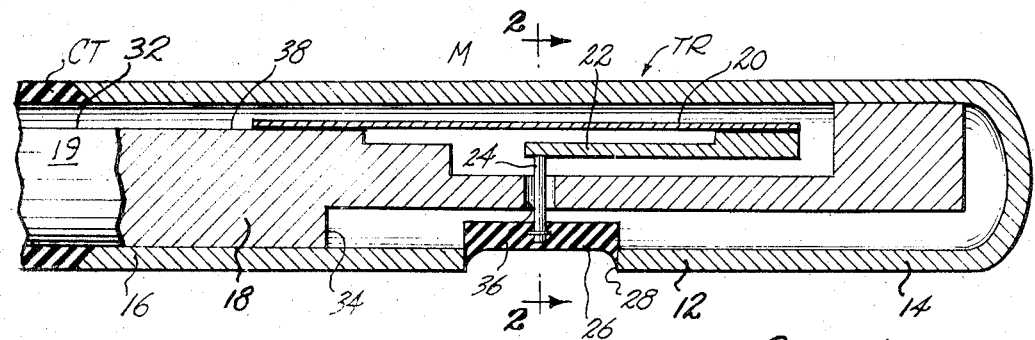
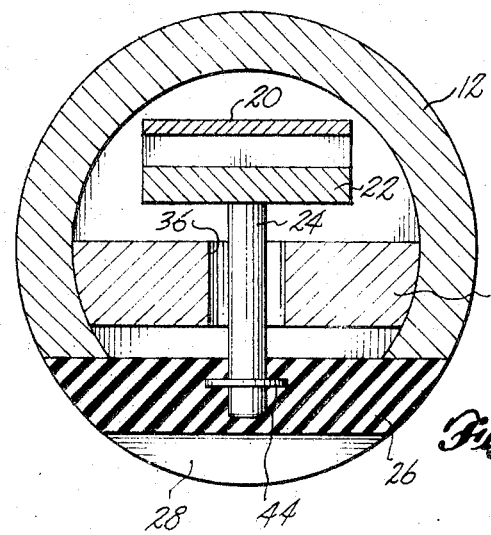
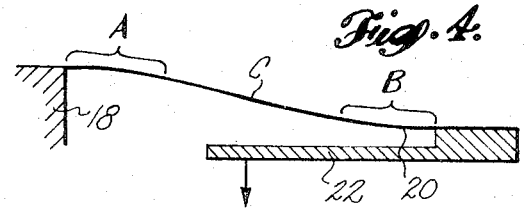
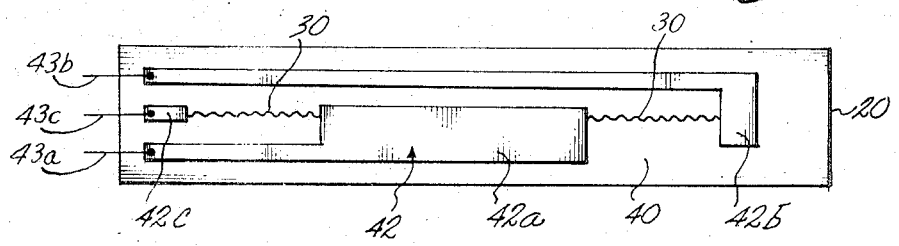
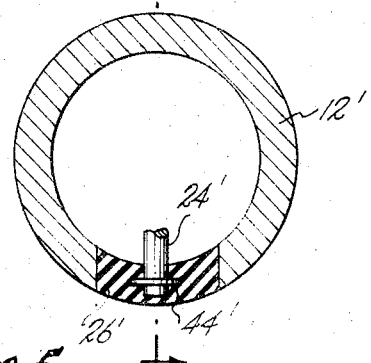
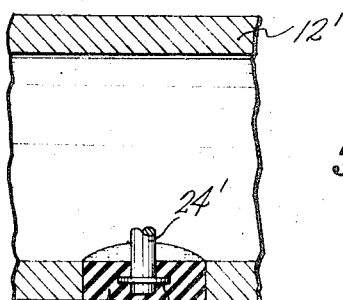
INVENTOR
CECIL K. STEDMAN
BY
Graybeal, Cole & Barnard
ATTORNEYS

United States Patent Office 3,553,625
Patented Jan. 5, 1971

3,553,625
SIDE SENSITIVE MINIATURIZED PRESSURE TRANSDUCER
Cecil K. Stedman, Enumclaw, Wash., assignor to Statham Instruments, Inc., Los Angeles, Calif., a corporation of California
Filed Dec. 29, 1967, Ser. No. 694,488
Int. Cl. G01l 1/22
U.S. Cl. 338—4                          11 Claims

ABSTRACT OF THE DISCLOSURE

Miniaturized pressure transducers for intracardiac and like applications employing a cylindrical housing having a side placed rubber diaphragm, and a beam type flexure member mounting film type electroconductive strain sensing elements, placed on a single surface of the beam and subject to both tensive and compressive strain upon deflection of the beam. A plurality of leads connect the strain sensitive elements into a conventional Wheatstone bridge circuit. A lever arm or "paddle" is fixed to the loaded end of the beam and extends generally parallel to the beam and a linkage pin interconnects the diaphragm and the lever arm below the midpoint of the flexural beam.

BACKGROUND OF THE INVENTION

Field of the invention

This invention relates to improvements in strain sensitive devices of the type commonly known as transducers or strain gages, and more particularly relates to miniaturized, small diameter pressure sensitive transducers of a type suitable for intracardiac and like applications.

Description of the prior art

Known miniaturized pressure transducers for intracardiac and like applications, such as disclosed in Greenwood U.S. Pat. 2,981,911, and Stedman U.S. Pat. 3,242,449, provide pressure responsive sensitivity by arranging one or more bridge arms on a deformable sleeve or tube and measuring the strain developed by fluid pressure within the sleeve. These types of transducers are inherently quite delicate and are susceptible to fluid flow induced inaccuracies.

Improved intracardiac transducer performance presents several requirements. The instrument should have a small diameter (e.g., about 1/16"), and should employ a flexural member of substantial size, with a single mounting surface for the bridge arms, subject to both tensive and compressive stresses. Compound flexure of the arm mounting surface affords greater bridge sensitivity than would otherwise be obtained, and a single mounting surface of the bridge arms reduces fabrication difficulties and enables formation of all arms by simultaneous vapor deposition to provide greater bridge arm uniformity, in terms of relative operating characteristics.

SUMMARY OF THE INVENTION

One such transducer that meets the foregoing requirements is described in my copending and concurrently filed application, Ser. No. 694,520, entitled, Miniaturized Pressure Transducer, filed Dec. 29, 1967. This transducer is end-sensitive, i.e., senses pressure at an end of the transducer housing, and employs a flexure member in the form of an end-clamped beam.

The present invention also meets the foregoing requirements but is side-sensitive, i.e., measures pressure at the side of the transducer housing. The flexure member is in the form of a beam fixed at one end and flexed at the other, with the free end of the beam being flexed by a force applying member in the form of an elongate lever arm disposed generally parallel of the beam and extending from the free end of the beam toward the fixed end. Force is applied through a linkage pin in a direction perpendicular to the beam surface and along a line aligned with the midpoint of the beam to produce a balanced flexural loading of the beam. As a result of the moment, surface portions of the beam are placed respectively in compression and tension, with a stress reversal or "null" point midway therebetween. This flexural arrangement permits the simultaneous fabrication of all strain sensitive elements of the bridge without loss of sensitivity due to the miniaturized size. An additional advantage is that this form of beam allows the leads to be fastened to the strain sensitive elements at the clamped end of the beam and thus the limberness of the beam is not diminished.

BRIEF DESCRIPTION OF THE DRAWING

FIG. 1 is a longitudinal vertical section showing a typical embodiment of a transducer characteristic of the present invention, adapted for intracardiac usage.

FIG. 2 is a transverse vertical section taken along the line 2—2 of FIG. 1.

FIG. 3 is a diagrammatic plan of a portion of the transducer shown in FIG. 1.

FIG. 4 is a diagrammatic illustration showing the beam and lever arm under loading, with the loading exaggerated for clarity.

FIG. 5 is a transverse vertical section of a portion of a modified form of transducer.

FIG. 6 is a fragmentary, vertical section, taken substantially along the line 6—6 of FIG. 5.

DETAILED DESCRIPTION

As best shown in FIG. 1, the transducer assembly, generally designated TR, includes a cylindrical housing 12 having a smoothly rounded outer end 14 and an inner end 16 connected to the end of a conventional catheter tubing CT. The catheter tubing serves primarily as a probe to insert the transducer into an artery or other vessel containing the fluid to be monitored as to pressure. Secured within the cylindrical housing, as by cementing, is a frame 18, which suitably ends adjacent the outer end 14 of the housing. An inner end 19 of the frame 18 extends into the catheter tubing where it is again cemented. A flexural member or beam 20 is secured at one end to the frame and at its free end to a lever arm or "paddle" 22. A pin or linkage rod 24 connects the free end of the lever arm to a deformable diaphragm 26 mounted in a recess 28 of the housing. The linkage rod is attached to the lever arm directly below the longitudinal midpoint of the beam. Deformation of the diaphragm due to pressure changes externally of the housing will cause the beam to flex, and the flexure is sensed by strain sensitive electroconductive elements or bridge arms 30 (FIG. 3), conventionally interconnected in a Wheatstone bridge circuit (not shown).

The frame 18, as best shown in FIGS. 1 and 2, is provided with an upper recess 32 which houses the lever arm 22 and most of the beam 20. A lower slot 34 is provided and may serve as a mounting area for temperature compensating strain gages, not shown. The recess and slot are joined by a central aperture 36 which surrounds the linkage rod 24. The upper surface of the frame is provided with a smooth ledge 38 upon which the anchored end of the beam 20 is secured.

The anchored end of the beam 20 is preferably cemented to the ledge 38 and the beam is preferably stainless steel. As best shown in FIG. 3, the beam 20 has a gage mounting surface 40 on which is bonded an insulative substrate, not shown, of silicon monoxide (SiO) film or the like. The bridge arms 30 are bonded to the insulative substrate preferably in the form of a single strip of deposited chromium film. The procedure for vapor deposition of these films is known per se.

In the alternative, the bridge arms 30 may be fabricated in any other well-known manner, such as by being preformed from strips or wire, and cemented to the insulative substrate.

Conductor tabs 42 are film deposited on the insulative substrate overlying portions of the bridge arms 30. The conductor tabs are also suitably of chromium but are deposited to a substantially greater film thickness than the bridge arms so as to be of much lower resistance than the arms 30. Specifically, the conductor tabs 42 may consist of a center tab 42a, a right-hand tab 42b, and a left-hand tab 42c, the left-hand and right-hand designations being as viewed in FIG. 3. As shown, each of the tabs terminates adjacent the left-hand or anchored end of the beam and advantageously may be connected to conductor wires or leads 43a, 43b, 43c which lead out of the catheter tubing CT in a manner known per se. The bridge arms 30 are preferably positioned on the beam at the areas of maximum strain, whereas the central conductor tab 42a overlies the centrally disposed null zone or area of lesser strain. These areas are noted on the diagrammatic illustration in FIG. 4 with A representing the area of maximum tensive strain, B the area of maximum compressive strain, and C the null zone.

As best seen in FIGS. 1 and 4, the lever arm 22 is secured to the free end of the beam 20, preferably by cementing. The lever arm is in the shape of an L having its long arm extending parallel to the beam and toward the fixed end thereof. A linkage rod 24 is secured to the lever arm 22 in perpendicular relation to the midpoint M of the beam. The linkage rod 24, which preferably is in the form of a cylindrical pin, is connected at its opposite end to the diaphragm 26, as by being embeddingly molded therein.

The diaphragm 26 is preferably molded in place using a self-vulcanizing silicone rubber. A suitable rubber is Silastic RTV 891 marketed by the Dow Corning Corporation. In the alternative, the diaphragm can be prefabricated and cemented into place in the housing. As best shown in FIG. 2, the linkage rod 24 is embedded in the rubber and, in the preferred embodiment, is cemented to a small metallic disk 44 also embedded in the rubber. The disk 44 is not essential, however, and may be omitted if desired. In the preferred form the exterior surface of the diaphragm is slightly recessed relative the outer contour of the housing, as shown at FIG. 2. The diaphragm can be contoured to be flush with the outside surface of the housing 12', as shown at diaphragm 26' in FIGS. 5 and 6.

In general, the theory and mode of operation of the illustrated single end clamped beam 20 is similar to that shown and described in the patent to Eisele U.S. Pat. No. 3,341,796. An example of a satisfactorily tested embodiment employing this theory is given below, utilizing a beam of 347 stainless steel and a linkage rod of 304 stainless steel:

Beam width=0.028"
Beam thickness=0.0018"
Beam length=0.134"
Lever arm width=0.028"
Lever arm thickness at its thinnest point=.005
Lever arm length=0.067 (½ the beam length)
Housing inside diameter=0.055"
Linkage rod diameter=0.005"
Linkage rod length=approximately .030"
Diaphragm effective area=approximately $4.3 \times 10^{-4}$ square inches
Diaphragm thickness=approximately 0.010"
Diaphragm active width=approximately 0.040"
Diaphragm length=approximately 0.10".

It will be understood that various further modifications may be made in the construction and application of the disclosed assembly. Consequently, the scope of the invention is not limited to the specific forms thereof illustrated and discussed but is to be determined by the following claims.

What is claimed is:

1. Miniaturized pressure transducer for intracardiac and like applications, comprising:
   (a) an elongated housing;
   (b) a flexural beam positioned lengthwise in said housing and having a flexural, nominally planar strain gage mounting surface, said mounting surface including regions of compressive strain, tensive strain and zero strain and rigid support means at an end of said beam;
   (c) an electroconductive film pattern including a plurality of deposited film strain sensitive elements on said gage mounting surface, such that said strain sensitive elements are located on said mounting surface at regions of maximal compressive and tensive strain;
   (d) a plurality of electrical leads electrically connected to said film pattern at the end thereof adjacent the rigidity supported end of the beam;
   (e) pressure responsive deformable means disposed generally along a side of said housing;
   (f) means interconnecting said pressure responsive deformable means and said beam for transmitting force from said pressure responsive deformable means to said beam.

2. The transducer of claim 1, wherein said pressure responsive deformable means is recessed in a side of said housing.

3. The transducer of claim 1, wherein said pressure responsive deformable means is molded in place.

4. The transducer of claim 3, wherein said pressure responsive deformable means is formed of self-vulcanizing silicone rubber.

5. The transducer of claim 1, further including a frame mounted in said housing and wherein said flexural beam is fastened at one end to said frame.

6. Miniaturized pressure transducer for intracardiac and like applications, comprising:
   (a) an elongated housing;
   (b) a flexural beam positioned lengthwise in said housing and having a flexural, nominally planar strain gage mounting surface, and rigid support means at an end of said beam;
   (c) an electroconductive film pattern including a plurality of deposited film strain sensitive elements on said gage mounting surface;
   (d) a plurality of electrical leads electrically connected to said film pattern at the end thereof adjacent the rigidly supported end of the beam;
   (e) pressure responsive deformable means disposed generally along a side of said housing;
   (f) means interconnecting said pressure responsive deformable means and said beam for transmitting force from said pressure responsive deformable means to said beam, said interconnecting means including an elongated lever arm disposed parallel to said beam and fixed to the free end thereof.

7. The transducer of claim 6, wherein said interconnecting means comprises a linkage rod fastened to said lever arm and said pressure responsive deformable means and extending substantially perpendicularly of the strain gage mounting surface of said flexural beam.

8. The transducer of claim 7, wherein said pressure responsive deformable means includes a rigid disc integral with said linkage rod and embedded in said deformable means.

9. Miniaturized pressure transducer for intracardiac and like applications, comprising:
   (a) an elongated housing;
   (b) a flexural beam positioned lengthwise in said housing and having a flexural, nominally planar strain gage mounting surface, and rigid support means at an end of said beam;

(c) an electroconductive film pattern including a plurality of deposited film strain sensitive elements on said gage mounting surface;

(d) a plurality of electrical leads electrically connected to said film pattern at the end thereof adjacent the rigidly supported end of the beam;

(e) pressure responsive deformable means disposed generally along a side of said housing;

(f) means interconnecting said pressure responsive deformable means and said beam for transmitting force from said pressure responsive deformable means to said beam, said interconnectig means including an elongated lever arm disposed generally parallel to said beam and fixed to the free end thereof, and a linkage rod fastened to said lever arm and said lever arm and said pressure responsive deformable means, the movement of the linkage rod and lever arm by said deformable means being in a direction substantially perpendicular to the plane of the unstressed strain gage mounting surface.

10. A pressure transducer comprising elongated, generally cylindrical housing means, means positioned at the side of said housing means for sensing a change in pressure externally thereof and deforming in response thereto, nominally planar flexure means mounted in said housing and being fixed at one end and having its other end free, means interconnecting said free end and said means for sensing a change in pressure whereby pressure changes are transmitted to said flexure means, an electroconductive film pattern including a plurality of deposited film strain sensitive elements on said flexure means and in part overlying the fixed end of said flexure means, and conductor leads each electrically connected to said film pattern at the end thereof overlying the fixed end of the flexure means.

11. The pressure transducer of claim 10, wherein said flexure means has a mounting surface that includes regions of compressive strain, tensive strain and zero strain and wherein said strain sensitive elements are located on said mounting surface at regions of maximal compressive and tensive strain.

References Cited

UNITED STATES PATENTS

| | | | |
|---|---|---|---|
| 2,772,569 | 12/1956 | Ruge | 338—4 |
| 2,858,400 | 10/1958 | Statham | 338—5 |
| 2,959,056 | 11/1960 | Traite | 73—398 |
| 3,303,452 | 2/1967 | Booth | 73—141(A) |
| 3,341,794 | 9/1967 | Stedman | 338—4 |
| 3,411,361 | 11/1968 | McLellan | 338—4X |
| 3,456,226 | 7/1969 | Vick | 338—4X |

RODNEY D. BENNETT, JR., Primary Examiner

T. H. TUBBESING, Assistant Examiner

U.S. Cl. X.R.

338—5; 73—398